United States Patent [19]

Voss

[11] Patent Number: 5,035,600
[45] Date of Patent: Jul. 30, 1991

[54] APPARATUS FOR CONVERTING THERMOPLASTIC BLANKS INTO SHAPED ARTICLES

[75] Inventor: Hermann Voss, Hamburg, Fed. Rep. of Germany

[73] Assignee: Nissei ASB Machine Co., Ltd., Nagano, Japan

[21] Appl. No.: 484,566

[22] Filed: Feb. 23, 1990

[51] Int. Cl.⁵ .................. B26C 49/06; B26C 49/36; B26C 49/78
[52] U.S. Cl. ................................ 425/161; 425/162; 425/361; 425/540
[58] Field of Search ............... 425/361, 540, 150, 161, 425/162, 116, 576, 522, 538, 165, 162, 383, 384, 546

[56] References Cited
U.S. PATENT DOCUMENTS

| | | | |
|---|---|---|---|
| 2,994,107 | 8/1961 | Quinche | 425/576 |
| 3,661,489 | 5/1972 | Moore | 425/116 |
| 3,932,095 | 1/1976 | Moore | 425/540 |
| 4,313,720 | 2/1982 | Spurr | 425/540 |
| 4,726,757 | 2/1988 | Berry | 425/576 |

Primary Examiner—Willard E. Hoag
Attorney, Agent, or Firm—Peter K. Kontler

[57] ABSTRACT

Apparatus for converting thermoplastic blanks into shaped articles has a wheel-shaped conveyor which carries an outwardly extending link for a coupling which can engage successive blanks of a series of blanks during advancement along a first portion of its endless path. The blank is transported through a heating unit and thereupon enters the cavity of a mold to be converted into a shaped article which is removed from the mold and is delivered to an article receiving unit. The blank heating unit, the mold and the article receiving unit are respectively adjacent to second, third and fourth portions of the endless path. The conveyor can be driven at a variable speed and in stepwise fashion to be decelerated during advancement of a blank through the heating unit and to come to a halt while the blank is being converted into a shaped article. Alternatively, the link can be pivoted in and counter to the direction of rotation of the conveyor to thus accelerate or decelerate the coupling relative to the conveyor. This renders it possible to drive the conveyor at a constant speed.

20 Claims, 1 Drawing Sheet

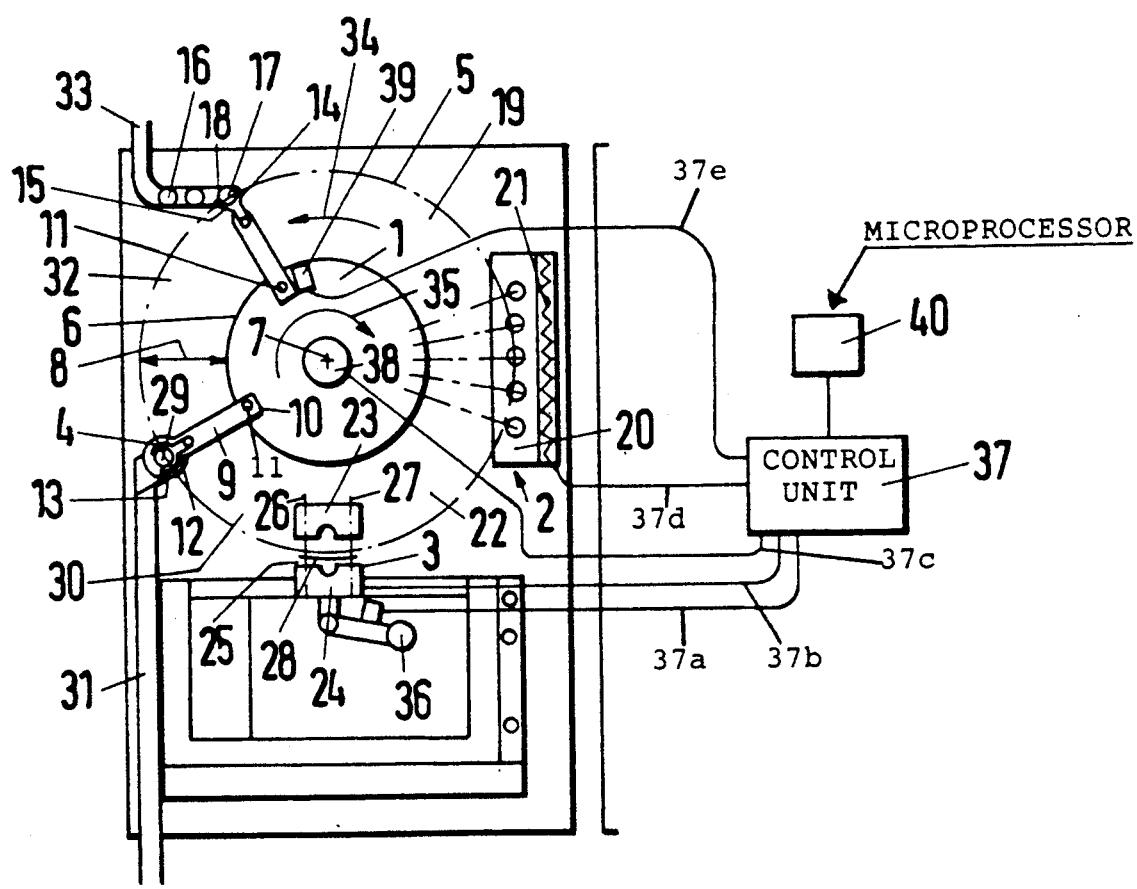

APPARATUS FOR CONVERTING THERMOPLASTIC BLANKS INTO SHAPED ARTICLES

BACKGROUND OF THE INVENTION

The invention relates to improvements in molding apparatus in general, and more particularly to improvements in apparatus for converting thermoplastic blanks (e.g., tubular parisons) into shaped articles (e.g., into bottles or other blow molded articles).

Conventional apparatus for converting a series of thermoplastic blanks (e.g., blanks which consist of synthetic thermoplastic material) into shaped articles normally comprise a source of blanks, a heating unit which raises the temperature of successive blanks or successive groups of blanks to a desired temperature, one or more open-and-shut molds wherein the conversion of properly heated blanks into shaped articles takes place, and a transporting system which serves to advance blanks from the source to the heating unit, from the heating unit to the mold or molds and, if necessary, from the mold or molds to an article accepting station.

It is further known to provide a molding apparatus with a rotary conveyor which carries one or more molds. This creates problems because the mold or molds on the rotating conveyor must be connected with an energy source in order to ensure adequate heating of mold sections. In addition, and if the conversion of blanks involves blow molding of tubular or otherwise shaped hollow parisons into hollow shaped articles, the apparatus must further comprise means for supplying a pressurized gaseous fluid to the mold or molds on the rotary conveyor. All this contributes to complexity and higher initial and maintenance cost of the molding apparatus. Another drawback of such molding apparatus is that the transmission of signals from a stationary control unit to the movable and/or other components of the apparatus on the rotary conveyor also contributes to complexity of the apparatus and renders the apparatus more prone to malfunction with resulting prolonged periods of idleness. Removal of shaped articles from the molds on the rotary conveyor also contributes to the cost of the apparatus and prevents an increase of output above a rather modest value. Additional limits to the output are imposed by the means for transmitting energy and signals to the components on the rotary conveyor.

OBJECTS OF THE INVENTION

An object of the invention is to provide a novel and improved molding apparatus which is simpler, more compact and more reliable than heretofore known apparatus.

Another object of the invention is to provide the molding apparatus with novel and improved means for transporting thermoplastic blanks to and for transporting finished articles from the mold or molds.

A further object of the invention is to provide an apparatus wherein the energy requirements of parts on the transporting means are negligible in comparison with conventional apparatus.

An additional object of the invention is to provide a novel and improved mounting for the device or devices which support blanks during transport to the molding station or stations and thereupon support shaped articles during transport away from the molding station or stations.

Still another object of the invention is to provide a novel and improved method of manipulating thermoplastic blanks and shaped articles in a molding apparatus.

A further object of the invention is to provide the apparatus with a novel and improved array of stations for delivery and treatment of blanks and for shaping and manipulation of molded articles.

An additional object of the invention is to provide a novel and improved arrangement for accelerating and/or decelerating blanks and/or shaped articles in the above outlined molding apparatus.

SUMMARY OF THE INVENTION

The invention is embodied in an apparatus for converting thermoplastic blanks (e.g., parisons) into shaped articles (e.g., into blow molded bottles or other hollow articles). The improved apparatus comprises transporting means including a conveyor (e.g., a wheel which is rotatable about a substantially vertical axis), supporting means mounted on the conveyor for advancement along an endless path in response to rotation of the conveyor in a predetermined direction (e.g., in a clockwise direction), means for supplying blanks to the supporting means in a first portion of the path, means for heating blanks during advancement of the supporting means along a second portion of the path downstream of the first portion (as seen in the direction of rotation of the conveyor), an open-and-shut mold adjacent a third portion of the path downstream of the second portion and having means (e.g., a plurality of mold sections and means for supplying compressed gaseous fluid into the blank within the mold cavity between the mold sections) for converting blanks into shaped articles, and a chute or other suitable means for receiving shaped articles from the supporting means in a fourth portion of the path between the third and first portions. The supporting means can include jaws, claws or other suitable gripping elements at least one of which is movable relative to each other gripping element to engage a blank in the first portion and to release a shaped article in the fourth portion of the path.

The transporting means can further comprise means for rotating the conveyor at a substantially constant speed or at a plurality of different speeds (e.g., at a first speed during advancement of supporting means along the second portion of the path and at a different second speed (such as zero speed) while the supporting means is located at the third portion of the path.

The transporting means can further comprise means for fixedly or movably connecting the supporting means to the conveyor In the latter instance, the apparatus further comprises means for moving the supporting means relative to the conveyor. Such moving means can include means for moving the supporting means relative to the conveyor in and counter to the predetermined direction of rotation of the conveyor about its axis. For example, the moving means can comprise means for moving the supporting means relative to the conveyor counter to the direction of rotation of the conveyor during advancement of the supporting means along the second portion of the path (this entails a deceleration of the supporting means). In addition to or in lieu of such mode of operation, the moving means can comprise means for moving the supporting means relative to the conveyor in the direction of rotation of the conveyor intermediate the second and third portions of the path (this amounts to an acceleration of the supporting means). Still further, the moving means can include means for moving the supporting means relative to the conveyor counter to the direction of rotation of the conveyor at the third portion of the path (this preferably entails temporary stoppage of the supporting means while the conveyor continues to rotate). The moving means can also comprise means for moving the supporting means relative to the conveyor in the direction of rotation of the conveyor intermediate the third and fourth portions of the path and/or means for moving the supporting means relative to the conveyor in the direction of rotation of the conveyor intermediate the first and second portions of the path.

The means for movably connecting the supporting means to the conveyor can comprise a link which is pivotable relative to the conveyor and carries the supporting means, and the aforementioned moving means can include a mechanism which serves to pivot the link relative to the conveyor. The mechanism can be designed to hold the supporting means against movement relative to the conveyor at the first portion of the path, i.e., the speed of movement of the supporting means during acceptance of a blank at the first portion of the path is then directly proportional to rotational speed of the conveyor.

The heating means can include one or more preferably adjustable heating elements which serve to heat the blanks to a predetermined temperature during advancement of supporting means along the second portion of the path.

As mentioned above, the transporting means preferably includes means for temporarily arresting the supporting means at the third portion of the path, either by arresting the conveyor or by moving the supporting means relative to the conveyor counter to the direction of rotation of the conveyor.

The transporting means preferably further comprises control means, and such control means includes means for determining the speed of advancement of the supporting means along the endless path. The means for determining the speed of movement of the supporting means along the path includes the aforementioned means for moving the supporting means relative to the conveyor (provided that the apparatus employs transporting means wherein the supporting means is movably connected to the conveyor). The transporting means can further comprise a microprocessor which is operatively connected with the control means.

The transporting means can include two or more supporting means which are rigidly or movably connected to the conveyor.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The single Figure of the drawing is a schematic plan view of an apparatus which embodies one form of the present invention and wherein the rotary conveyor of the transporting means carries a plurality of circumferentially spaced apart supporting means for thermoplastic blanks and shaped articles.

DESCRIPTION OF PREFERRED EMBODIMENTS

The drawing shows a blow molding apparatus wherein the means for transporting thermoplastic blanks 16 and finished shaped articles 29 comprises a wheel-shaped conveyor 1 which is rotatable about a vertical axis 7. The transporting means further comprises a variable-speed or constant-speed motor 38 which serves to rotate the conveyor 1 at a variable speed or at a constant speed, a plurality of supporting means 13 in the form of couplings with pairs of jaws, claws or other suitable gripping members 14, 15, links 9 which serve to connect the couplings 13 to the conveyor 1, and mechanisms 39 which can serve to move the links 9 relative to the conveyor 1 in the direction of arrow 34 (counter to the direction of rotation of the conveyor 1 about the axis 7 or in the opposite direction (arrow 35). The conveyor 1 and the links 9 serve to advance the couplings 13 along an endless path 5 having a first portion 18 at the outlet 17 of a means 33 (e.g., a duct or chute) which supplies discrete blanks 16 into the range of oncoming pairs of gripping members 14, 15. An elongated second portion 20 of the path 5 extends along a stationary heating unit 2 with one or more preferably adjustable heating elements 21 serving to heat successive blanks 16 to an optimum temperature for conversion into shaped articles 29 (e.g., bottles) in a third portion of the path 5, namely in the cavity 25 of an open-and-shut mold 3. Successive shaped articles 29 are delivered to and are accepted by an article receiving means 31 (e.g., a chute or duct) which is located at a fourth portion 4 of the path 5 and defines a second path for advancement of shaped articles 29 to storage or to a processing station, not shown.

The illustrated path 5 is or can be an endless circular path which is concentric with the periphery 6 of the rotary conveyor 1. The reference character 8 denotes the distance between the periphery 6 and the path 5 in the radial direction of the conveyor 6. The distance 8 equals the effective length of a link 9. Each of these links has an inner end portion 10 which is pivotally connected to the conveyor 1, as at 11, and an outer end portion 12 which carries the respective supporting means or coupling 13. At least one of the two gripping members 14, 15 of each coupling 13 is movable relative to the other gripping member in order to ensure that a blank 16 can be properly engaged at the discharge end 17 of the supplying means 33 (i.e., in the first portion 18 of the path 5), and that a shaped article 29 can be released in time on arrival into the fourth portion 4 of the path 5 of gravitational descent or for mechanical transfer into the inlet of the article receiving means 31. Each coupling 13 can comprise three or more jaws, claws or otherwise configured gripping members. If the mechanisms 39 are not actuated, they fixedly (i.e., non-movably) connect the respective couplings 13 to the conveyor 1 in the illustrated positions in which the coupling are located at a maximum distance from the axis 7 and advance along the endless path 5 when the motor 38 is set in motion to rotate the conveyor 1 in the direction of arrow 35. The gripping members 14, 15 of the couplings 13 can be designed to engage predetermined portions (e.g., neck portions) of blanks 16 which are to be converted into shaped articles 29 in the cavity of the mold 3.

The path portion 19 between the portions 18 and 20 of the path 5 can extend along an arc of approximately 100 degrees. The path portion 20 for the couplings 13 of the illustrated apparatus extends along an arc of less than 100 degrees; the length of this path portion should suffice to ensure reliable heating of successive blanks 16 to an optimum temperature not later than at the outlet of the heating unit 2, i.e., before a heated blank 16 enters an arcuate path portion 22 between the path portion 20 and the mold 3 (at the aforementioned third portion of the path 5). The heating action of the heating element or elements 21 in the heating unit 2 and/or the position of each such heating element relative to the path portion 20 can be regulated in response to signals from a control unit 37 which can be said to form part of the transporting means including the conveyor 1 and the links 9 with their couplings 13. Care should be exercised to avoid overheating of blanks 16 in the heating unit 2 because this could entail discoloration and/or other structural and/or qualitative changes of the shaped articles 29. If the blanks 16 are tubular parisons, their axes are preferably parallel to the axis 7 of the conveyor 1, i.e., the mounting of the gripping members 14, 15 on the outer end portions 12 of the respective links 9 is or can be such that the inclination of the axes of such parisons relative to the axis 7 remains unchanged in each angular position of the conveyor 1.

The arcuate portion 22 of the path 5 can extend along an arc of approximately 60 degrees. A freshly heated blank 16 then enters the cavity 25 of the mold 3. The illustrated mold 3 comprises two mold sections 23, 24 which are movable toward and away from the coupling 13 in the third portion of the path 5. The third portion of the path 5 extends through the mold cavity 5; this ensures that the blank 16 which is in the process of being converted into a shaped article 29 need not be deflected, i.e., its inclination with reference to the axis 7 of the conveyor 1 need not be changed while the mold sections 23, 24 move toward each other in order to close the cavity 25 preparatory to admission of a gaseous fluid (e.g., compressed air) by way of a conduit 36. The tracks for the mold sections 23, 24 are respectively shown at 26 and 27; these tracks are normal to a tangent 28 to the third portion of the path 5. The movements of mold sections 23, 24 toward and away from each other are initiated by signals which are transmitted by the control unit 37. The drawing shows conductors 37a, 37b, 37c, 37d, 37e which respectively connect the corresponding outputs of the control unit 37 with valve means in the conduit 36 for compressed gaseous fluid, with the motor means for the mold sections 23, 24, with the motor 38 for the conveyor 1, with the heating unit 2 and with the mechanism 39 for pivoting one of the links 9 relative to the conveyor 1. The input of the control unit 37 is connected with a microprocessor 40.

The reference character 30 denotes a further arcuate portion of the path 5 between the mold 3 and the article receiving means 31. The couplings 13 advance shaped articles 29 from the cavity 25 of the opened mold 3 to the inlet of the article receiving means 31. The path portion 30 can extend along an arc of approximately 60 degrees. A further arcuate portion 32 of the path 5 extends between the fourth portion 4 and the first portion 18. Empty couplings 13 advance along the path portion 32 from the receiving means 31 to the discharge end 17 of the supplying means 33 to receive fresh blanks 16. The path portion 32 can extend along an arc of approximately 100 degrees.

The length of the path portion 30 is preferably selected with a view to ensure that a shaped article 29 which has been removed from the cavity 25 of the opened mold 3 is sufficiently cooled to prevent undesirable deformation during admission into and during advancement along the second path which is defined by the receiving means 31.

If the mechanisms 39 are set to fixedly connect the respective links 9 to the conveyor 1, the latter is preferably rotated at a variable speed and can come to a full halt at the station accommodating the mold 3, at the inlet to the article receiving means 31 and at the discharge end 17 of the blank supplying means 33. The conveyor 1 can be accelerated to rapidly advance a coupling 13 along the path portions 19 and 22 and can be decelerated to slowly advance a coupling 13 along the path portion 20. It is also advisable to decelerate a coupling 13 during advancement along the path portion 30 and to accelerate such coupling during advancement along the path portion 32. Corresponding signals are transmitted by the control unit 37 to the motor 38 via conductor means 37c. It is not invariably necessary to arrest a coupling 13 in the path portion 18 and/or in the path portion 4, i.e., it is possible to deliver blanks 16 to an empty coupling 13 while the respective link 9 is in motion with the conveyor 1 and/or to deliver shaped articles 29 from a coupling 13 to the receiving means 31 while the conveyor 1 advances the respective link 9 along the fourth portion 4 of the path 5. Acceleration of the coupling or couplings 13 along the path portions 19, 22 and 32 is desirable and advantageous in order to shorten each cycle of the apparatus as well as to ensure that the temperature of a freshly heated blank 16 does not drop below an optimum temperature during advancement of the respective coupling 13 along the path portion 22.

It is presently preferred to operate the apparatus in such a way that an empty coupling 13 which enters the path portion 32 is accelerated on its way toward and is thereupon decelerated during the last stage of advancement to the discharge end 17 of the blank supplying means 33.

Repeated stoppages, acceleration and deceleration of the conveyor 1 can entail extensive wear upon the conveyor and its bearings. Moreover, such movements must be initiated and regulated by relatively complex controls. The energy requirements of the means for accelerating and braking the conveyor 1 are relatively high. For the foregoing reasons, it is preferred to rotate the conveyor 1 at a constant speed or to avoid pronounced fluctuations of the RPM and complete stoppage of the conveyor at one or more stations. This can be readily accomplished due to the provision of the links 9 and mechanisms 39 which serve as a means for moving the respective links 9 relative to the conveyor 1 in the direction of arrow 35 (acceleration of the respective couplings with reference to the conveyor) or in the direction of arrow 34 (deceleration of the coupling with reference to the conveyor). In other words, the speed of movement of a coupling 13 along the path 5 in the direction of arrow 35 can be reduced (all the way to zero) in response to pivoting of the respective link 9 in the direction of arrow 34, and the speed of such movement of the coupling in the direction of arrow 35 can be increased by pivoting the respective link in the direction of arrow 35 while the motor 38 rotates the conveyor 1 at a constant speed.

By way of example, the control unit 37 can be programmed to cause the motor 38 to rotate the conveyor 1 at a constant speed in the direction of arrow 35. When a coupling 13 approaches the path portion 18, the control unit 37 causes the respective mechanism 39 to pivot the link 9 in the direction of arrow 34 so that the coupling is decelerated during reception of a fresh parison or another blank 16 from the discharge end 17 of the supplying means 33. The coupling 13 and its blank 16 are thereupon accelerated during advancement along the path portion 19 in that the control unit 37 transmits a signal (via conductor means 37e) to pivot the link 9 in the direction of arrow 35. The control unit 37 thereupon causes the mechanism 39 to pivot the link 9 in the direction of arrow 34 so that the blank 16 is decelerated during advancement along the path portion 20. The next control step involves pivoting the link 9 in the direction of arrow 35 to accelerate the freshly heated blank 16 during advancement along the path portion 22, and the control unit 37 thereupon causes the mechanism 39 to rapidly pivot the link 9 in the direction of arrow 34 when the blank 16 enters the mold cavity 25. At such time, the conveyor 1 continues to rotate at a constant speed (in the direction of arrow 35) but the coupling 13 is at a standstill during that interval of time which is required to close the mold 3, to admit a requisite quantity of pressurized gaseous fluid in response to opening of the valve means in the conduit 36 (signal via conductor means 37a) and to thereupon open the mold 3 so that the freshly formed shaped article 29 can leave the third portion of the path 5. The mold sections 23, 24 can begin to move toward each other (i.e., in a direction to close the mold cavity 25) and can be properly accelerated even before the freshly heated blank 16 reaches the mold cavity. This shortens the interval of dwell of the coupling 13 at the molding station.

The exact manner of properly programming the control unit 37 to ensure optimum heating of successive blanks 16 during advancement along the path portion 20 and to avoid excessive cooling during advancement along the path portion 22 forms no part of the present invention. The valve means which receives signals via conductor means 37a is preferably designed to open in immediate response to complete closing of the mold 3; this too, contributes to a shortening of the interval of dwell of a coupling 13 at the molding station.

The control unit 37 causes the mechanism 39 to pivot the link 9 in the direction of arrow 35 during advancement of the freshly formed shaped article 29 along the path portion 30. The resulting acceleration of the coupling 13 during the initial stage of advancement along the path portion 30 can be quite pronounced. The control unit 37 thereupon decelerates the coupling 13 and the shaped article 29 during the last stage of advancement along the path portion 30 in order to ensure predictable transfer of the article 29 into the receiving means 31. The coupling 13 is thereupon rapidly accelerated during the first stage of advancement along the path portion 32 and is preferably decelerated not later than when it reaches the discharge end 17 of the blank supplying means 33.

The microprocessor 40 can receive, store and transmit to the control unit 37 information regarding the periods of heating successive blanks 16 during advancement along the path portion 20 and acceleration and deceleration or stoppage of the coupling or couplings 13 in all other portions of the path 5. Signals which are transmitted via conductor means 37a can be used to control the intervals of opening of the valve means in the conduit 36 as well as the pressure of compressed gaseous fluid which is to be admitted into a blank 16 in the mold cavity 25.

An important advantage of the improved apparatus is its simplicity. Thus, the only rotating or orbiting components which must receive signals from the control unit 37 are the mechanisms 39 which serve to move the couplings 13 and their links 9 relative to the conveyor 1. All other energy consuming and signal receiving components (such as the heating unit 2, the mold 3 and the valve means in the conduit 36) are adjacent the path 5 of advancement of the blanks 16 and shaped articles 29. The gripping members 14, 15 of the couplings 13 can be opened and closed by cams and/or electromagnets which are adjacent the path 5. The feature that the energy consuming components and the majority of signal receiving components are adjacent to, rather than mounted on, the conveyor 1 contributes to simplicity of the control unit 37.

The mechanisms 39 can include rack and pinion drives, electromagnets, fluid-operated motor means or any other devices which can pivot the links 9 in a clockwise as well as in a counterclockwise direction at a required speed and through selected angles. Stepping motors can be used with equal advantage.

The selected rotational speed of the conveyor 1 is the dominant parameter. All other parameters, such as the intensity of heating action by the elements 21 of the unit 2 (i.e., the quantity of heat supplied per unit of time), the interval of opening of valve means in the conduit 36 and the speed and timing of opening and closing the mold 3, will depend upon the selected rotational speed of the conveyor 1. This holds true if the conveyor 1 is driven at a constant speed. If the conveyor 1 is to be driven intermittently and at a variable speed, the apparatus can employ a very simple heating unit and a very simple mold because the speed of the conveyor 1 is then selected in dependency upon the heating action of the selected heating unit and/or in dependency upon the construction and mode of operation of the selected mold or molds. Thus, the conveyor 1 can be arrested when a freshly heated blank 16 enters the mold cavity 25 and remains at a standstill until the molding operation is completed and the mold is opened again to permit evacuation of the freshly formed shaped article. Analogously, the conveyor can be driven at a very low speed or can even come to a halt during the interval of heating a blank 16 to requisite temperature for introduction into the mold.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for converting thermoplastic blanks into shaped articles, comprising transporting means including a conveyor rotatable about a predetermined axis; supporting means mounted on said conveyor for advancement along an endless path in response to rotation of said conveyor in a predetermined direction; means for supplying blanks to said supporting means in a first portion of said path; means for heating blanks during advancement of said supporting means along a second portion of said path downstream of said first portion; an open-and-shut mold adjacent a third portion of said path downstream of said second portion and having means for converting blanks into shaped articles; and means for receiving shaped articles from said supporting means in a fourth portion of said path between said third and first portions.

2. The apparatus of claim 1, wherein said conveyor comprises a wheel and said supporting means includes gripping elements at least one of which is movable relative to each other gripping element to engage a blank in the first portion and to release a shaped article in the fourth portion of said path.

3. The apparatus of claim 1, wherein said transporting means further comprises means for rotating said conveyor at a substantially constant speed.

4. The apparatus of claim 1, wherein said transporting means comprises means for rotating said conveyor at a plurality of different speeds including a first speed during advancement of said supporting means along said second portion of said path and a different second speed while said supporting means is located at the third portion of said path.

5. The apparatus of claim 1, wherein said transporting means further comprises means for fixedly connecting said supporting means to said conveyor.

6. The apparatus of claim 1, wherein said transporting means further comprises means for movably connecting said supporting means to said conveyor.

7. The apparatus of claim 6, further comprising means for moving said supporting means relative to said conveyor.

8. The apparatus of claim 7, wherein said moving means includes means for moving said supporting means relative to said conveyor in and counter to said direction.

9. The apparatus of claim 8, wherein said moving means comprises means for moving said supporting means relative to said conveyor counter to said direction during advancement of said supporting means along the second portion of said path.

10. The apparatus of claim 8, wherein said moving means comprises means for moving said supporting means relative to said conveyor in said direction intermediate the second and third portions of said path.

11. The apparatus of claim 8, wherein said moving means comprises means for moving said supporting means relative to said conveyor counter to said direction at the third portion of said path.

12. The apparatus of claim 8, wherein said moving means comprises means for moving said supporting means relative to said conveyor in said direction intermediate the third and fourth portions of said path.

13. The apparatus of claim 8, wherein said moving means comprises means for moving said supporting means relative to said conveyor in said direction intermediate the first and second portions of said path.

14. The apparatus of claim 1, wherein said transporting means further comprises means for movably connecting said supporting means to said conveyor and means for holding said supporting means against movement relative to said conveyor at the first portion of said path.

15. The apparatus of claim 1, wherein said heating means includes means for heating the blanks to a predetermined temperature during advancement along the second portion of said path.

16. The apparatus of claim 1, wherein said transporting means includes means for temporarily arresting said supporting means in the third portion of said path.

17. The apparatus of claim 1, wherein said transporting means further comprises control means including means for determining the speed of advancement of said supporting means along said path.

18. The apparatus of claim 17, wherein said transporting means further comprises means for movably connecting said supporting means to said conveyor and said means for determining the speed of advancement of said supporting means along said path includes means for moving said supporting means relative to said conveyor.

19. The apparatus of claim 17, wherein said transporting means further comprises a microprocessor which is connected with said control means.

20. The apparatus of claim 1, wherein said transporting means comprises additional supporting means on said conveyor.

* * * * *